United States Patent [19]

Grieu

[11] Patent Number: 5,338,923
[45] Date of Patent: Aug. 16, 1994

[54] SYSTEM FOR THE EXCHANGE OF DATA BETWEEN AN ELECTRONIC OBJECT COUPLED TO A TRANSFER DEVICE WITH DISTINCT DATA BIT RATES, INSERTABLE OBJECT AND CORRESPONDING TRANSFER DEVICE

[75] Inventor: Francois Grieu, Paris, France

[73] Assignee: Smartdiskette GmbH, Idstein/TS, Fed. Rep. of Germany

[21] Appl. No.: 869,784

[22] Filed: Apr. 16, 1992

[30] Foreign Application Priority Data

Apr. 25, 1991 [FR] France ............... 91 05369

[51] Int. Cl.$^5$ ............................................. G06K 19/06
[52] U.S. Cl. ................................. 235/492; 370/102
[58] Field of Search ............. 395/775, 275; 360/137; 235/492; 370/102

[56] References Cited

U.S. PATENT DOCUMENTS

| | | | |
|---|---|---|---|
| 4,151,373 | 4/1979 | Widmer et al. | 370/102 |
| 4,650,981 | 3/1987 | Foletta | 235/449 |
| 4,701,601 | 10/1987 | Francini et al. | 235/449 |
| 4,786,791 | 11/1988 | Hodama | 235/482 |
| 4,791,283 | 12/1988 | Burkhardt | 235/438 |
| 4,873,684 | 10/1989 | Kobayashi et al. | 370/102 |
| 4,885,746 | 12/1989 | Fukushima et al. | 370/102 |
| 4,891,727 | 1/1990 | Sato et al. | 360/137 |
| 4,920,547 | 4/1990 | Murakami | 370/102 |
| 4,924,171 | 5/1990 | Baba et al. | 323/347 |
| 5,014,271 | 5/1991 | Fujimoto | 370/102 |
| 5,149,945 | 9/1992 | Johnson et al. | 235/492 |
| 5,159,182 | 10/1992 | Eisele | 235/492 |

FOREIGN PATENT DOCUMENTS

0373411 11/1989 European Pat. Off. .

*Primary Examiner*—E. Rollins Cross
*Assistant Examiner*—Erick Solis
*Attorney, Agent, or Firm*—Merchant & Gould Smith, Edell, Welter & Schmidt

[57] ABSTRACT

A system for the exchange of data between a transfer device and an "intelligent insertable object" that comprises an electronic memory associated with an access circuit and emulates a magnetic recording support with respect to a magnetic read/write head of the transfer device, the data exchange bit rate of the transfer device being greater than that of the circuit providing access to the memory of the insertable object, the system comprising means to limit the bit rate of useful elements in the apparent bit rate of data elements entering and leaving the transfer device, so that it is compatible with the bit rate leaving and entering the circuit providing access to the memory of the insertable object. The system can be applied notably to the exchange of data elements between a microcomputer and an electronic card that can be inserted into the disk drive of the microcomputer or into a memory card reader.

13 Claims, 2 Drawing Sheets

SYSTEM FOR THE EXCHANGE OF DATA BETWEEN AN ELECTRONIC OBJECT COUPLED TO A TRANSFER DEVICE WITH DISTINCT DATA BIT RATES, INSERTABLE OBJECT AND CORRESPONDING TRANSFER DEVICE

BACKGROUND OF THE INVENTION

1. Field of the Invention

The field of the invention is that of systems for the exchange of data between two elements capable of being coupled together.

More specifically, the system of the invention finds application in the exchange of data between at least one movable, insertable electronic object and at least one transfer device wherein:

said specific transfer device comprises means for the transfer of data into and/or out of the memory of the insertable object;

said insertable object, hereinafter called a "smart insertable object" comprises an electronic memory associated with an access circuit and coupling means accessible from the exterior of the insertable object enabling the temporary coupling, by any means, of said insertable object with said transfer object.

In the sense used in relation to the present invention, the coupling of the insertable object with the transfer device can be done not only by the total or partial physical introduction of the insertable object into the transfer device but also by the simple placing of one against the other or, again, by any other type of physical arrangement enabling the exchange of data between them.

For example, the system according to the invention can be applied to the exchange of data between a microcomputer and an electronic element that can be inserted into the disk drive of the microcomputer, or into a memory card reader.

2. Description of the Prior Art

This situation corresponds notably to the teachings of the prior patent documents EP-A-0 373 411, U.S. Pat. No. 4,701,601 and U.S. Pat. No. 4,791,283.

The patent document EP-A-0 373 411 published on Jun. 20, 1990 relates to an artefact of an element of a magnetic strip card, diskette or cassette type capable of being inserted in a data-processing machine such as a computer or a microcomputer. According to this document, the insertable element is fitted out with a processor, a data and/or program memory, and an interface emulating the means of communication used by a standard insertable element to communicate with the data processing equipment. The processor makes it possible to carry out operations of coding and/or decoding and encrypting and/or decrypting message signatures or access controls which are, for example, the conditions for the use of a microcomputer. One of the vital elements of this type of system is the electrical supply of the interface of the insertable element. According to this document, the power source may be constituted by a cell or, again, by a generator activated by the movement of insertion of the insertable element into the data processing equipment.

The document U.S. Pat. No. 4,701,601 delivered on Oct. 20, 1987 describes the general principle of a microprocessor-based portable bank transaction card comprising data processing peans and means to emulate a magnetic strip so that it can be compatible with bank terminals for the reading of magnetic strip cards. This patent mentions the problems of the availability of a source of power sufficient to supply the card, notably means for the emulation of a magnetic strip (col. 5, 1.64–67) and proposes the use of solar panels for recharging an accumulator in minimizing the emulation periods (col. 7, 11.31 to 54).

The U.S. Pat. No. 4,791,283 delivered on Dec. 13, 1988 also relates to a microprocessor-based portable bank card comprising data processing means and means to emulate a magnetic strip. More specifically, it describes a possible configuration and geometry of circuits to make means to generate a magnetic field throughout practically the entire length of a card, enabling the emulation of each binary element (bit) of information to be transmitted. The electrical supply to the circuits is done by an external energy source (col. 4, II.29–35).

These two prior art documents relate specifically to the field of bank cards. They disclose no means of configuration of the data exchanged between the card and the transaction terminal, and do not satisfactorily resolve the problem of supplying the microprocessor card with electrical power.

These problems are, however, decisive ones.

Generally speaking, a portable or insertable object such as a "smart" diskette or memory card, namely provided with at least one electronic memory associated with access circuits is characterized, firstly, by its independence and, secondly, by its processing capacity.

As regards the processing of the exchanged data, one of the problems that arises relates to the compatibility of the data bit rates among the processing means of the transfer device, the coupling means and the circuits providing access to the electronic memory of the insertable object. More specifically, notably in the case of magnetic coupling means such as those used by the exchange of data between a diskette and the disk drive of a microcomputer, the bit rate is standardized, typically at a value of 250 to 500 Kbits per second.

The reception or transmission of data elements at these bit rates calls for a corresponding processing capacity on the part of the circuits providing access to the electronic memory of the insertable object. The term "circuits providing access to the memory" here as well as further below implies any means capable of managing access to said memory, including a microprocessor or a microcontroller (a microprocessor incorporating interface elements such as an UART or universal asynchronous receiver transmitter (asynchronous serializer/deserializer) and/or memory of its own).

Now, in the current state of art, it is difficult to meet this requirement under commercially and technically acceptable conditions.

It is true that there are compact processors capable of being mounted in a flat element such as a memory card or diskette, and capable of managing data elements at these flow rates. However, these processors consume a quantity of power that exceeds the capacity of the best performing cells now available at reasonable cost (for example Li—Mg cells), for a satisfactory period of use in the desired application.

Furthermore, there do exist microprocessors which are more economical in terms of power consumed, but their performance characteristics are not sufficient to process the data bit rates considered.

Finally, we may envisage a specific microprocessor configuration adapted to these constraints, but the cost of designing such components and the relatively small size of the market envisaged for these specific microprocessors makes this approach unprofitable in principle.

Furthermore, the magnetic coupling means used in the disk drives of microcomputers generally include specific data coding means with which they have to be compatible. Thus, the microcomputers of the type marketed by IBM used a coding called MFM (modified frequency modulation), and those marketed by the Apple firm used a coding called GCR (group coded recording). The MFM, GCR or equivalent codings are essentially aimed at coding information elements in a form adapted to the constraints of magnetic transmission, and any system of data exchange in this context should take account of these constraints.

SUMMARY OF THE INVENTION

The invention is aimed at resolving these different problems.

More precisely, the aim of the invention is to provide a system of data exchange between a smart insertable object and a transfer device, said system enabling the use, in the insertable object, of components working at a lower bit rate than the coupling means through which said insertable object communicates with said transfer object.

Another aim of the invention, adapted to one of its preferred embodiments, is to enable the making of smart compact diskettes, compatible with the standardized magnetic disk drives with which microcomputers, in particular, can be fitted out, in using commonly available electronic components that consume little power, despite the low capacity of components of this type in processing high bit rates.

These aims, as well as others that shall appear here below, are achieved according to the invention by means of a system for the exchange of data between at least one movable, insertable electronic object and at least one transfer device, said insertable object comprising an electronic memory associated with an access circuit and coupling means enabling the temporary coupling of said insertable object with said transfer device;

said transfer device comprising means for the transfer of data into and/or out of the memory of the insertable object;

said insertable object emulating a magnetic recording support with respect to a magnetic read and/or write head of the transfer device, the data exchange bit rate of the transfer device being greater than that of the access circuit of the memory of the insertable object, wherein said system comprises means to limit the bit rate of useful data in the apparent bit rate of data entering and/or leaving the transfer device, so that it is compatible with the bit rate leaving and/or entering the access circuit of the memory of the insertable object.

In this way, not only is the exchange of data between the transfer device and the insertable object made possible, but also a substantial part of the processing capacity of rate adaptation can be transferred into the transfer device, as shall be seen further below, thus making it possible to economize on the processing capacity of the insertable object.

According to a preferred characteristic of the invention, said means to limit the bit rate of useful data elements include means to insert padding information into the flow of data entering and/or leaving the transfer device.

Advantageously, said means to insert the padding information include means for the redundant coding and/or n times ($n \geq 2$) replication of at least certain of said useful data, in the flow of data entering and/or leaving the transfer device.

Preferably, in the channel for the exchange of data in the direction going from said transfer device towards said insertable device, said means for the replication of at least some of the useful data cooperating with specific coding means of the MFM, GCR or equivalent type, positioned downline from said replication means, said replication and MFM or equivalent coding means being located in the transfer device.

In this case, advantageously, the combination of the data processing operations by the replication means and then the MFM or equivalent coding means gives, for each bit of useful information, a sequence of data within which there alternate series of ones and zeros according to a first pattern for a useful bit equal to zero, and according to a second pattern for a useful bit equal to one, wherein said insertable bit comprises pattern discrimination means discriminating between the first and second patterns so as to recover each of the successive useful bits in the data flow entering said insertable object.

It is advantageously possible to choose a method for the insertion of padding elements leading, after MFM, GCR or equivalent coding by the transfer device, to periodic predetermined patterns displaying changes in state according to a first periodicity for the first pattern and according to a second periodicity, different from the first periodicity, for the second pattern. In this way, the recognition of the patterns may be reduced to a simple frequency discrimination.

To simplify the processing system in the insertable object, said frequency discrimination means may thus directly supply the series/parallel converter associated with a processor located in said insertable object, synchronized with the frequency of periodic pattern changing in the flow of data entering said insertable object.

According to another advantageous characteristic, said useful data elements are assembled in data streams comprising delimiters, before the processing operations by said replication and MFM or equivalent coding means, and said delimiters provide for the locking of synchronization of said circuits providing access to the memory of the insertable object. Thus, in the advantageous example where the circuits providing access to the memory comprise a microprocessor accessible through a deserializer, it is the latter that gets synchronized with the delimiters. This makes it possible to avoid resorting to means, generally costly in terms of power, to synchronize the clock signal of the processor of the insertable object with the data received from the transfer device, namely synchronizing means such as a phase-lock loop or equivalent device.

Preferably, in the channel for the exchange of data in the direction going from said insertable object to said transfer device, said means for the insertion of padding data include means to memorize pre-prepared sequences of bits and means for the transmission of said pre-prepared sequences as a function of useful data elements to be transmitted. Said pre-prepared sequences of bits are obtained, for example, from processing operations of replication, MFM or equivalent coding and/or CRC coding.

Preferably, the useful data elements are provided byte by byte, and said means to insert padding data insert a padding sequence at the instant of each reading of a new byte of useful data elements in the electronic memory of said insertable object.

BRIEF DESCRIPTION OF THE DRAWINGS

Other features and advantages of the invention shall appear from the following description of a preferred embodiment of the invention, given by way of a non-restrictive embodiment, and from the appended drawings, of which.

MORE DETAILED DESCRIPTION

Figure 1:
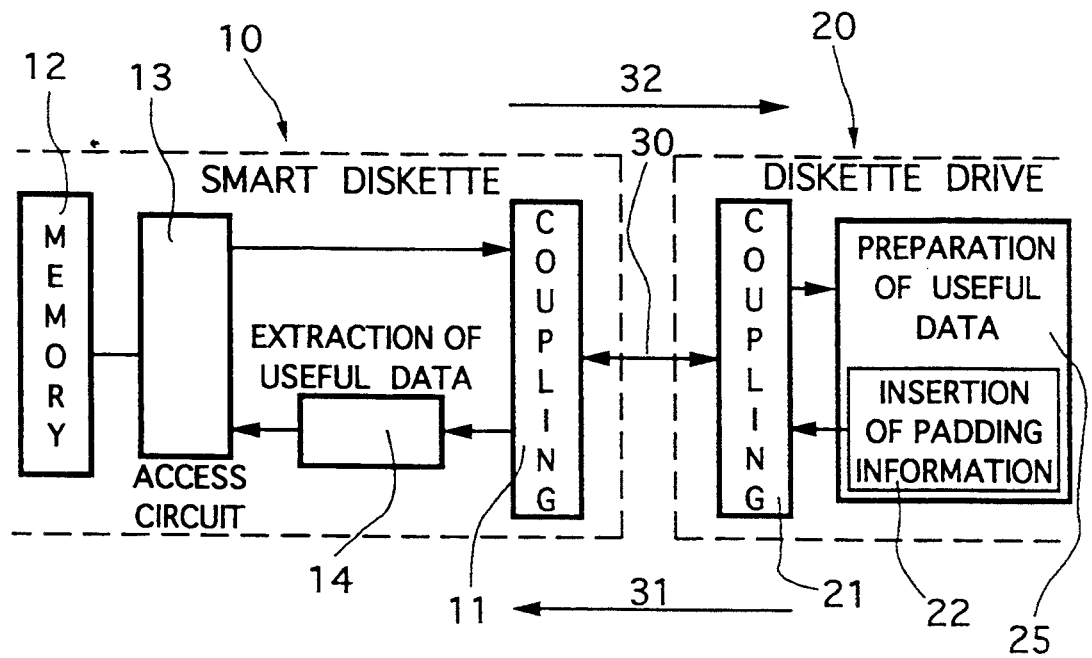
FIG. 1 gives a schematic view of the main functional modules coming into play in the processing line of the data exchange system of the invention.

FIG. 1 brings out the main functional modules coming into play in the data exchange system of the invention.

The drawing of FIG. 1 shows the placing of an insertable object 10 into communication with a transfer device 20. The object 10 and the device 20 communicate through their coupling means 11, 21. Preferably, these coupling means are magnetic coupling means but the invention can also be transposed to other types of coupling means, for example electromagnetic, optical, capacitive means etc.

In the example discussed here below, the transfer device 20 corresponds to the standardized disk drive of a microcomputer, and the insertable object 10 is a "smart" diskette, namely a diskette provided with an electronic memory 12 associated with an access circuit 13 and comprising coupling means 11 emulating a standard diskette with respect to the disk drive 20.

The invention makes it possible to meet a twofold constraint:
  providing for the standard bit rate prescribed for the flow of data 30 exchanged with the disk drive (typically 250 to 500 Kbits per second);
  using means for the processing of data in the smart disk 10 possessing a limited processing capacity, and notably being incapable of processing any other than a bit rate smaller than that of the data flow 30, owing to the limitations of the circuit 13.

The coupling means 11, 21 mutually exchange a data flow 30, having an apparent bit rate equal to the standard bit rate.

According to the invention, the apparent bit rate of the data flow 30, namely the number of bits per second really exchanged, is greater than the bit rate of useful data in the flow of data 30. This results from the fact that the useful data elements have undergone a prior processing operation by which padding information (for example redundant, over-abundant or non-significant information) has been added to the useful information to form the data flux 30.

Thus, in the channel for the exchange of data in the direction 31 going from the disk drive 20 to the smart disk 10, the disk drive has a module 22 comprising means to insert padding information into the data flow 30 coming out of the disk drive 20.

The data flow 30 entering the smart disk 10 should then be processed in the module 14 for the extraction, therefrom, of the useful data which will be exploited by the assembly formed by the electronic memory 12 and its access circuits 13.

Figure 2:
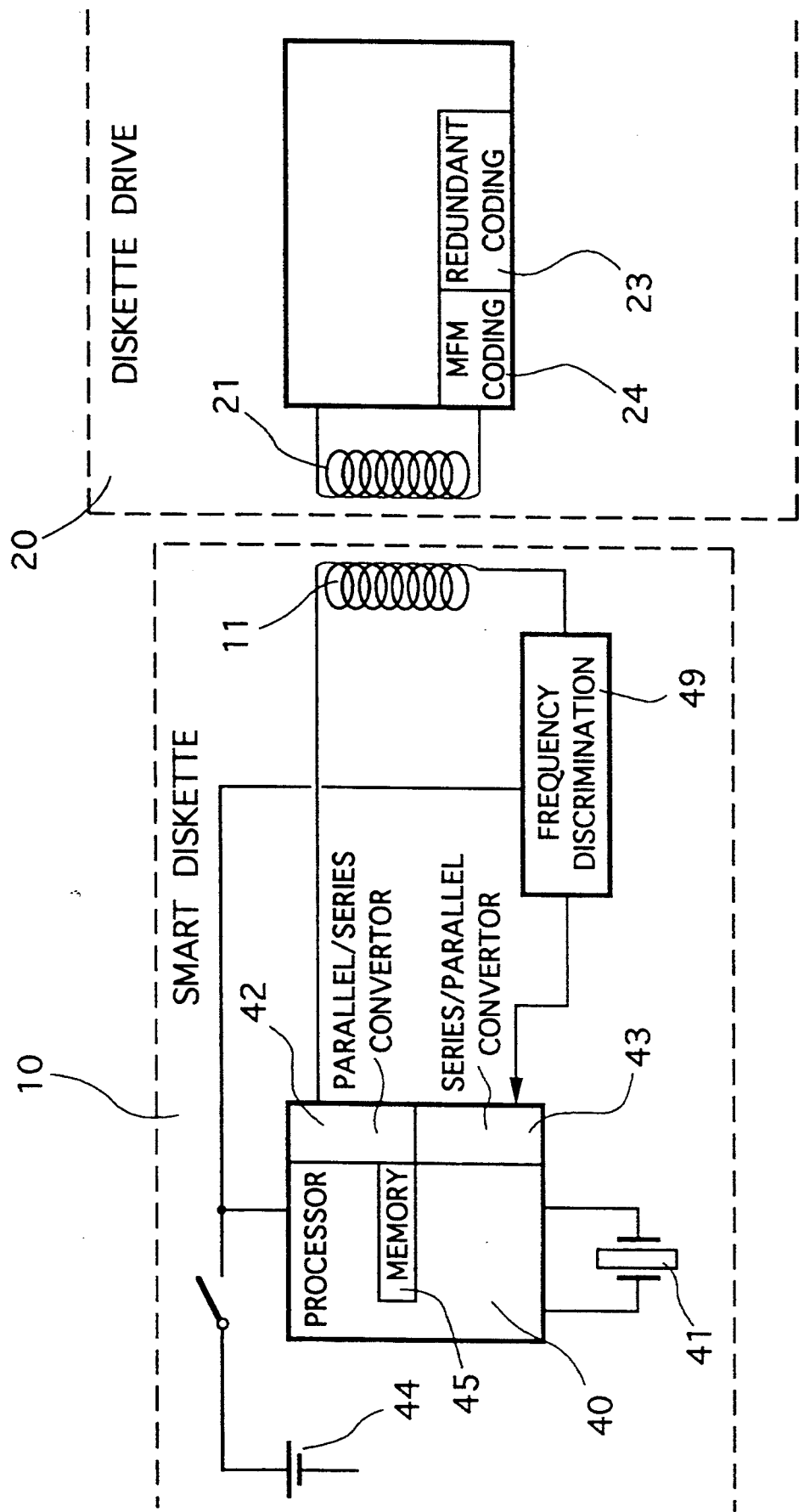
FIG. 2 illustrates a preferred embodiment of the system of FIG. 1, using available components.

FIG. 2 illustrates a concrete preferred embodiment of the functional drawing of FIG. 1.

The smart diskette 10 is built around a processor 40, for example of the class 68HC05 marketed by MOTOROLA, for example the 68HC05C4 or, again, the 68HC05A6.

The processor M68HC05A6 is an 8-bit processor having the following resources:

4 Kbytes of ROM;
176 bytes of RAM;
2 Kbytes of EEPROM;
1 clock circuit activated by an external crystal 41;
1 parallel/series converter 42;
1 asynchronous series/parallel converter 43.

By using a 2 MHz crystal 41, the consumption of the processor 40 should be of the order of 3 milliamperes at 3 volts. At this frequency, the processing speed attained is about 56% of the processing speed of a presently available chip card fitted out with a MOTOROLA microprocessor. These performance characteristics are sufficient to perform, for example, DES type cryptography algorithms, or again key management algorithms, in logic access control applications. Other types of algorithms, both present and future, and other types of applications are naturally compatible.

The electrical supply may be provided, for example, by a cell 44. Advantageously, the cell used may be a lithium-manganese cell of the 20-25 type (h=2.5 mm; diameter=20 mm; 3.0 V; 140 mA.h) or of the 24-30 type (h=3.0 mm; diameter=24.5 mm; 3.0 V; 270 mA.h).

A single 20-25 cell at 140 milliamperes/hour has an independent working time of 35 hours at a current of 4 milliamperes. This represents one year of operation at 5 minutes per day.

The smart diskette 10 further includes magnetic coupling means 11 which may be constituted, for example, by a simple coil, or again by devices of greater sophistication such as the one described in the patent document U.S. Pat. No. 4,791,283 discussed here above, or again by any other appropriate device.

Between the microprocessor 40 and the coupler 11, there is a frequency discrimination module 49 in the data exchange channel from the drive 20 toward the diskette 10.

In the drive 20-diskette 10 exchange channel, the useful data prepared by the processing means 25 of the reader undergo a dual cascade processing:
  a first processing 23 of coding by redundancy and/or by replication, by which each bit 0 or 1 of useful data is coded on n bits (n≧2);
  a coding 24 adapted to the transmission by magnetic coupling, of the MFM (modified frequency modulation) coding or other type.

Through this cascade coding, the bit rate of data elements transmitted to the magnetic couplers 21, 11 may attain the prescribed standard values (for example 500 Kbits per second) with useful data elements at a bit rate that is 2n times smaller.

Any other coding that achieves the same result may also be implemented. However, the coding recommended herein seems to be the optimum one at present, for the following reasons:

- the MFM (or equivalent) coding 24, typical of a transmission by magnetic coupling, makes it possible to optimize the transmission of information elements from the coupler 21 to the coupler 11;
- the redundancy coding 23 increases the apparent bit rate of data (which, moreover, is subsequently doubled by the MFM coding 24) in relation to the useful data bit rate;
- the coding 23 can finally be chosen so as to simplify the decoding done in the smart diskette 10.

Figure 3:
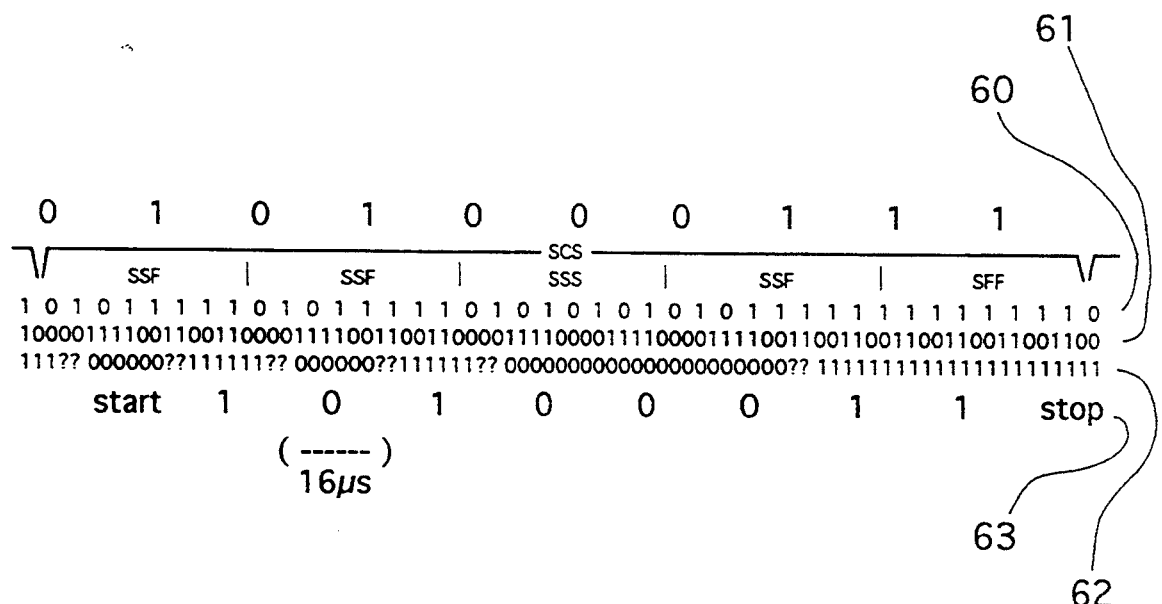
FIG. 3 illustrates the successive processing operations applied to useful data to be transmitted ($C5) along the processing line in the transmission channel from the transfer device to the processor of the embodiment of FIG. 2.

An exemplary implementation compatible with these different aims is illustrated in FIG. 3.

FIG. 3 illustrates the different coding steps carried out in the data exchange channel 31 going from the disk drive 20 to the smart diskette 10.

The example taken corresponds to the transmission of useful data $C5, which is the hexadecimal representation of the following byte:

11000101

The first step consists in framing this byte by delimiters, after having turned the byte over to place the least significant byte at the head:

```
 0 1 0 1 0 0 0 1 1 1
 |\_5_/ \_C_/ |
 Start         Stop
```

The redundant coding done in the module 23 is carried out according to the following rule:
each bit equal to 0 is coded in the form 0101.
each bit equal to 1 is coded in the form 1111.

Consequently, the byte $C5 between its two delimiters START(0) and STOP(1) is coded in the form of five successive bytes $5F $5F $55 $5F $FF as shown in line 60 of FIG. 3.

The data bit rate is therefore, in this case, multiplied by 5 after the implementation of this coding 23.

The data stream 60 obtained is then subjected to the MFM coding of the module 24.

The MFM coding is a standardized coding of a known type, used notably to obtain access to 720K diskettes. It is done according to the following rules:
each data bit at 1 is coded in the form ST (S=Steady, identical to the preceding bit; T=Transition: the reverse of the preceding bit);
each data bit at 0 is coded in the form SS if the preceding data bit is 1 or TS if the preceding data bit is 0.

By application of these rules, the transitions in the MFM data stream occur at intervals of 4.6 to 8 μS.

The result thereof is that the continuous sequences of the 11111111 type are coded in the form of transitions every 4 μS (square waves at 125 KHz) and the 01010101 sequences are coded in the form of transitions every 8 μS (62.5 KHz).

The line 61 of FIG. 3 shows the signal obtained at output of the MFM coding module 24 from the useful data $C5.

The MFM coding is done in the disk controller circuit of standard microcomputers.

The combination of codings done by the modules 23 and 24 elegantly simplifies the restitution of useful data elements in the diskette 10, by means of a simple frequency discriminating circuit 49.

More specifically, after the cascade coding, each useful data bit is coded in the form of a square signal of a different frequency depending on whether it corresponds to a 1 or to a 0. The frequency discriminator 49 therefore has the function of detecting the instantaneous frequency of the signal 61 and gives, at output, a signal 62 which is at the low level when a frequency of 62.5 KHz is detected (original useful bit=0) and is at the high level when a frequency of 125 KHz is detected (original useful bit at 1).

At output of the frequency discriminator 49, the useful data 63 are therefore directly given to the deserialiser 43 of the microprocessor 40 of the smart diskette 10. This deserialiser 43 corresponds to the receiver half of the asynchronous series/parallel converter (namely the UART or universal asynchronous receiver transmitter) of the microprocessor and receives the data elements between START/STOP delimiters (start and stop binary elements) so that the data elements are assembled in bytes and given in a form that is directly usable by the microprocessor 40.

The preparation of the data exchanged in the direction 32 (from the diskette 10 to the disk drive 20) may be done by using a parallel/series converter 42 internal or external to the microprocessor 40, in cooperation with a pre-prepared sequence memorizing zone 45.

So as to conform to the communication standard of the disk drives, the data elements sent to the drive 20 should be constituted by ID address marks, data address marks, data elements proper and, finally, a cyclic redundancy check word.

Owing to the relatively low processing speed of the processor 40, it may be necessary to increase the apparent bit rate of the data elements as compared with the bit rate of useful data elements produced by the processor 40, in order to conform to the transmission bit rates of the magnetic couplers 11, 21. In order to economize on the processing capacity of the processor, the coding of the useful data elements produced by the processor 40 will not take place in real time but will consist in sending precomputed sequences for each bit of useful data provided.

More specifically, the transmission procedure presents the following steps:
assembling of bytes of useful data, by way of illustration in sets of 8 (64 bits in all);
pre-computation of CRC and its MFM coding;
use of a program loop of the type shown in Table 1 (RomTxLoop) to send ID address marks and data address marks. These markers may be precomputed, coded in MFM and memorized in the memory zone 45, in conforming to all the clock violations expected by the control circuits of the drive 20;
the use of a program loop as shown in Table 2 (EncodLoop) to send the pre-computed sequence, coded in MFM and memorized at 45 corresponding to each of the useful bits of each of the eight bytes. The coding of useful bits may be, for example, close to the one carried out in the modules 23, 24:
the emission of the CRC pre-computed, MFM coded and memorized in the zone 45.

Tables I and II represent program steps expressed in the programming language of the MOTOROLA microprocessor 68HC05.

These program steps are given by way of an indication and can be used directly by those skilled in the art.

The instructions of the "run n cycles" type are introduced to adjust the rate of emission of data elements to the working rhythm of the parallel/series converter 43.

In table II, for each useful data bit equal to 1, the pattern sent is 00110011. For each bit equal to 0, the pattern sent is 00001111.

In this embodiment, the coding of the useful data elements is therefore identical for both directions of transmission.

However, the invention also covers embodiments where the codings are distinct. For example, it is possible to code each useful bit on lengthier sequences, notably to facilitate the detection made by the frequency discriminator circuit 49 in the transmission direction 31.

TABLE 1

| 1 |  | LDX | #8-1 | ; | number of bytes to be sent, minus 1 |
|---|---|---|---|---|---|
| 2 | RomTxLoop | LDA | $20,X | ;4 | read next byte in ROM |
| 3 |  | STA | SERTOPAR | ;4 | load in serailizer 42 |
| 4 |  | NOP |  | ;2 | wait 2 cycles |
| 5 |  | DEXC |  | ;3 | run through table and end of test |
| 6 |  | BPL | RomTxLoop | ;3 | loop |

TABLE 2

| 1 |  | LDX | #8 | ; | number of bytes to be sent |
|---|---|---|---|---|---|
| 2 |  | BRA | EncodStart |  |  |
| 3 | EncodLoop | LDA | #%00001111 | ;2 | sent a padding parttern for 0101 (start) |
| 4 |  | STA | SERTOPAR | ;4 | load in serializer 42 |
|  | ; (codage du bit 0) |  |  |  |  |
| 5 |  | NOP |  | ;2 | wait 2 cycles |
| 6 |  | BRSET | 0,TMP,IST0 | ;5 | test bit 0 of TMP |
| 7 |  | LDA | #%00001111 | ;2 | if 0, send pattern for 0101 |
| 8 |  | BRA | GST0 | ;3 |  |
| 9 | IST0 | TSTA |  | ;3 | wait 3 cycles |
| 10 |  | LDA | #%00110011 | ;2 | if 1, send pattern for 1111 |
| 11 | GST0 | STA | SERTOPAR | ;4 | load in serializer 42 |
|  | ; |  |  |  |  |
| 12; (coding of the bits 1,2,3,4,5 and 6 not shown) |  |  |  |  |  |
|  | ; (coding of the bit 7) |  |  |  |  |
| 13 |  | NOP |  | ;2 | wait 2 cycles |
| 14 |  | BRSET | 7,TMP,IST7 | ;5 | test bit 7 of TMP |
| 15 |  | LDA | #%00001111 | ;2 | if 0, send pattern for 0101 |
| 16 |  | BRA | GST7 | ;3 |  |
| 17 | IST7 | TSTA |  | ;3 | wait 3 cycles |
| 18 | EncodStart | LDA | #%00110011 | ;3 | if 1, send pattern for 1111 |
| 19 | GST7 | STA | SERTOPAR | ;4 | load in serializer 42 |
| ; |  |  |  |  |  |
| 20 |  | NOP | NOP | ;4 | wait 4 cycles |
| 21 |  | LDA | $80-1,X | ;4 | read next byte in the RAM |
| 22 |  | STA | TMP | ;2 | storage in TMP |
| 23 |  | LDA | #%00110011 | ;2 | send a padding pattern for 1111 (stop) |
| 24 |  | STA | SERTOPAR | ;4 | load in serializer 42 |
| ; |  |  |  |  |  |
| 25 |  | NOP | NOP | ;4 | wait 4 cycles |
| 26 |  | DECX |  | ;4 | run through table and end of test |
| 27 |  | BPL | EncodLoop | ;3 | loop |

What is claimed is:

1. A system for the exchange of data between at least one movable, insertable electronic object and at least one transfer device, said insertable object comprising an electronic memory associated with an access circuit and coupling means enabling the temporary coupling of said insertable object with said transfer device;

said transfer device comprising means for the transfer of data between the memory of the insertable object and the transfer device;

said insertable object emulating a magnetic recording support with respect to a magnetic read/write head of the transfer device, the data exchange bit rate of the transfer device being greater than that of the access circuit of the memory of the insertable object, wherein said system comprises means to limit the bit rate of useful data in the apparent bit rate of data entering and leaving the transfer device, so that it is compatible with the bit rate leaving and entering the access circuit of the memory of the insertable object, said means to limit the bit rate consisting of at least one means belonging to the group including the redundant coding and the n times (n≧2) replication of at least certain of said useful data, in the flow of data entering and leaving and the transfer device.

2. A system according to claim 1, wherein said means to limit the bit rate of useful data include means to insert padding information into the flow of data entering and leaving the transfer device.

3. A system according to claim 1 wherein, in the channel for the exchange of data in the direction going from said transfer device towards said insertable object, said means for the replication of at least some of the useful data elements cooperating with specific coding means belonging to the group including the MFM coding means, the GCR coding means or equivalent type coding means, positioned downline from said replication means, said replication and said specific coding means being located in the transfer device.

4. A system according to claim 3, wherein the combination of the data processing operations by the replication means and then the said specific coding means gives, for each bit of useful information, a sequence of data within which there alternate series of ones and zeros according to a first pattern for a useful bit equal to zero, and according to a second pattern for a useful bit equal to one, wherein said insertable object comprises pattern discrimination means discriminating between the first and second patterns so as to recover each of the successive useful bits in the flow of data entering said insertable object.

5. A system according to claim 4, wherein said first and second patterns are periodic predetermined patterns displaying changes in state according to a first periodicity for the first pattern and according to a second periodicity, different from the first periodicity, for the second pattern, and wherein said pattern discrimination means are frequency discrimination means.

6. A system according to claim 4, wherein said frequency discrimination means directly supply the series/parallel converter associated with a processor located in said insertable object, synchronized with the frequency of periodic pattern changing in the flow of data entering said insertable object.

7. A system according to claim 6, wherein said useful data elements are assembled in data streams comprising delimiters (START, STOP), before the processing operations by said replication and said specific coding means, and wherein said delimiters provide for the locking of synchronization of said circuits providing access to the memory of the insertable object.

8. A system according to claim 1, wherein, in the direction going from said insertable object to said transfer device, said means to limit the bit rate include means to memorize pre-prepared sequences of bits and means for the transmission of said pre-prepared sequences as a function of useful data elements to be transmitted.

9. A system according to claim 8, wherein said pre-prepared sequences of bits are obtained from processing operations of replication, MFM coding and CRC coding.

10. A system according to claim 8, wherein the useful data elements are provided byte by byte, and wherein said means to insert padding data insert a padding sequence at the instant of each reading of a new byte of useful data elements in the electronic memory of said insertable object.

11. An insertable object used in a system for the exchange of data between said insertable object and a transfer device, comprising an electronic memory associated with an access circuit and coupling means enabling the temporary coupling of said insertable object with said transfer device, and emulating a magnetic recording support with respect to a magnetic read/write head of the transfer device, the data exchange bit rate of the transfer device being greater than that of the access circuit of the memory of the insertable object, wherein said insertable object comprises means to limit the bit rate of useful data in the apparent bit rate of data entering and leaving the transfer device, so that it is compatible with the bit rate leaving and entering the access circuit of the memory of the insertable object, said means to limit the bit rate consisting of at least one means belonging to the group including the redundant coding and the n times (n≧2) replication of at least certain of said useful data, in the flow of data entering and leaving the transfer device.

12. A transfer device usable in a system for exchange between said transfer device and an insertable object, comprising means for the transfer of data between a memory of the insertable object and the transfer device, the data exchange bit rate of the transfer device being greater than that an access circuit of the memory of the insertable object, wherein said transfer device comprises means to limit the bit rate of useful data in the apparent bit rate of data entering and leaving the transfer device, so that it is compatible with the bit rate leaving and entering the access circuit of the memory of the insertable object, said means to limit the bit rate consisting of at least one means belonging to the group including the redundant coding and the n times (n≧2) replication of at least certain of said useful data, in the flow of data entering and leaving the transfer device.

13. A system for the exchange of data between at least one movable, insertable electronic object and at least one transfer device, said insertable object comprising an electronic memory associated with an access circuit and coupling means enabling the temporary coupling of said insertable object with said transfer device;

said transfer device comprising means for the transfer of data between the memory of the insertable object and the transfer device;

said insertable object emulating a magnetic recording support with respect to a magnetic read head of the transfer device, the data exchange bit rate of the transfer device being greater than that of the access circuit of the memory of the insertable object, wherein said system comprises means to limit the bit rate of useful data in the apparent bit rate of data entering and leaving the transfer device, so that it is compatible with the bit rate leaving and entering the access circuit of the memory of the insertable object, said means to limit the bit rate consisting of at least one means belonging to the group including the redundant coding and the n times (n≧2) replication of at least certain of said useful data in the flow of data entering and leaving the transfer device.

* * * * *

UNITED STATES PATENT AND TRADEMARK OFFICE
CERTIFICATE OF CORRECTION

PATENT NO. :     5,338,923

DATED       :     August 16, 1994

INVENTOR(S) :    Francois Grieu

It is certified that error appears in the above-identified patent and that said Letters Patent is hereby corrected as shown below:

In column 9, line 5 of TABLE 1, "DEXC" should be --DECX--.

In column 9, line 3 of TABLE 2, "parttern" should be --pattern--.

In column 9, line 26 of TABLE 2, ";4" should be --;3--.

In column 10, line 12, delete "and" before "the transfer".

In column 12, line 16, insert --of-- after "that".

Signed and Sealed this

Twenty-sixth Day of September, 1995

Attest:

BRUCE LEHMAN

Attesting Officer      Commissioner of Patents and Trademarks